United States Patent
Wang et al.

(10) Patent No.: US 11,150,373 B2
(45) Date of Patent: Oct. 19, 2021

(54) DETERMINING DIELECTRIC CONSTANT AND RESISTIVITY WITH INDUCTION MEASUREMENT

(71) Applicant: Schlumberger Technology Corporation, Sugar Land, TX (US)

(72) Inventors: Gong Li Wang, Sugar Land, TX (US); John Rasmus, Richmond, TX (US); Dean Homan, Damon, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/396,324

(22) Filed: Apr. 26, 2019

(65) Prior Publication Data
US 2019/0353819 A1    Nov. 21, 2019

Related U.S. Application Data

(60) Provisional application No. 62/663,992, filed on Apr. 27, 2018.

(51) Int. Cl.
*G01V 3/28* (2006.01)

(52) U.S. Cl.
CPC ...................... *G01V 3/28* (2013.01)

(58) Field of Classification Search
None
See application file for complete search history.

(56) References Cited

U.S. PATENT DOCUMENTS

| | | | | |
|---|---|---|---|---|
| 4,467,425 A * | 8/1984 | Schaefer | ........... | G01V 3/28 324/339 |
| 8,135,542 B2 | 3/2012 | Luling | | |
| 8,694,259 B2 | 4/2014 | Luling | | |
| 2011/0231098 A1* | 9/2011 | Omeragic | ........... | G01V 3/28 702/7 |
| 2012/0080197 A1* | 4/2012 | Dickens | ........... | G01V 3/12 166/369 |
| 2013/0261975 A1* | 10/2013 | Yang | ........... | G01V 3/28 702/10 |

(Continued)

OTHER PUBLICATIONS

Anderson et al., 2006, Observations of Large Dielectric Effects on Induction Logs, or, Can Source Rocks Be Detected With Induction Measurements, Paper OOO, SPWLA 47th Annual Logging Symposium, Veracruz, Mexico, Jun. 4-7, 2006 (12 pages).

(Continued)

*Primary Examiner* — Jas A Sanghera
(74) *Attorney, Agent, or Firm* — Trevor G. Grove

(57) ABSTRACT

The highly valuable properties of resistivity and dielectric constant of a geological formation may be determined using an induction measurement, even for a geological formation with bed boundary or dipping effects, using a one-dimensional (1D) formation model. Induction measurements may be obtained in a wellbore through the geological formation using one or more downhole tools. One or more processors may be used to perform an inversion to estimate resistivity and dielectric constant values of the geological formation. The inversion may be performed using the induction measurements and a one-dimensional model that includes a number of geological layers.

15 Claims, 11 Drawing Sheets

(56) References Cited

U.S. PATENT DOCUMENTS

| | | | | |
|---|---|---|---|---|
| 2016/0003964 A1* | 1/2016 | Celepcikay | ............. | G01V 3/28 |
| | | | | 702/7 |
| 2016/0170069 A1* | 6/2016 | Wang | ..................... | E21B 49/00 |
| | | | | 324/338 |
| 2017/0342818 A1* | 11/2017 | Roberson | ................ | E21B 17/08 |

OTHER PUBLICATIONS

Anderson et al., 2008, "Identifying Potential Gas-Producing Shales From Large Dielectric Permittivities Measured by Induction Quadrature Signals," Paper HHHH, SPWLA 49th Annual Logging Symposium, Edinburgh, Scotland, May 25-28, 2008 (10 pages).

Misra et al., Complex Electrical Conductivity of Mudrocks and Source-Rock Formations Containing Disseminated Pyrite , URTeC: 2163422, Unconventional Resources Technology Conference (URTeC), San Antonio, Texas, USA, Jul. 20-22, 2015. (15 pages).

Misra et al., "Dielectric effects in pyrite-rich clays on multifrequency induction logs and equivalent laboratory core measurements", Society of Petrophysicists and Well Log Analysts, SPWLA 56th Annual Logging Symposium held in Reykjavik, Iceland Jun. 25-29, 2016. (17 pages).

\* cited by examiner

DETERMINING DIELECTRIC CONSTANT AND RESISTIVITY WITH INDUCTION MEASUREMENT

CROSS REFERENCE TO RELATED APPLICATIONS

This application claims priority from and the benefit of U.S. Provisional Application Ser. No. 62/663,992, entitled "Determining Dielectric Constant and Resistivity with Induction Measurement," filed Apr. 27, 2018, which is herein incorporated by reference in its entirety for all purposes.

BACKGROUND

This disclosure relates to obtaining dielectric constant and resistivity of a formation using a downhole induction measurement.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties or characteristics of the geological formation surrounding the wellbore.

Resistivity and dielectric constant represent two highly valuable properties of the geological formation that may be inferred. These properties may be measured or calculated and formatted onto a well log, which plots the properties against the depth of the well. A well log showing resistivity and dielectric constant, among other properties, may allow producers to make more effective, informed exploration and production decisions, with all of the many benefits that entails. For certain geological formations, a measurement known as an induction measurement may be used in combination with a homogenous model to determine resistivity and dielectric constant. This may work reasonably well when the resistivity of the geological formation changes slowly or the resistivity contrast from bed to bed is small. When the formation contrast is high, however, the dielectric constant and resistivity logs obtained could be adversely affected by the bed boundary or layering effect in a significant manner. Indeed, when the formation is dipping relative to the plane of the downhole induction tool, a well log of resistivity and dielectric constant using a homogenous model may also be affected by the undesirable dipping effect.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method. The method includes obtaining induction measurements in a wellbore through a geological formation using one or more downhole induction well-logging tools; inverting the induction measurements based on a one-dimensional model comprising a plurality of geological layers; and generating resistivity and dielectric constant values of the geological formation based on the output of the inversion of induction measurements.

Another embodiment of the present disclosure relates to an article of manufacture comprising tangible, non-transitory, machine-readable media comprising instructions. The instructions include receiving induction measurements associated with wellbore through a geological formation obtained by one or more downhole induction well-logging tools. The instructions also include inverting the induction measurements based on a cost function, wherein the cost function comprises a misfit term, an entropy term, and a smoothing term. Further, the instructions include generating resistivity and dielectric constant values associated with the geological formation based on the output of the inversion of induction measurements.

Another embodiment of the present disclosure relates to a system comprising. The system includes a downhole well-logging tool configured to obtain one or more induction measurements from a geological formation. Further, the system includes a processor and a memory storing instructions to be executed by the processor. The instructions include receiving the induction measurements obtained by the downhole well-logging tool. The instructions also include inverting the induction measurements based on a one-dimensional model comprising a plurality of geological layers and a cost function, and wherein each geological layer of the one-dimensional model comprises a constant conductivity and a constant dielectric constant. Further, the instructions include generating resistivity and dielectric constant values associated with the geological formation based on the output of the inversion of induction measurements.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
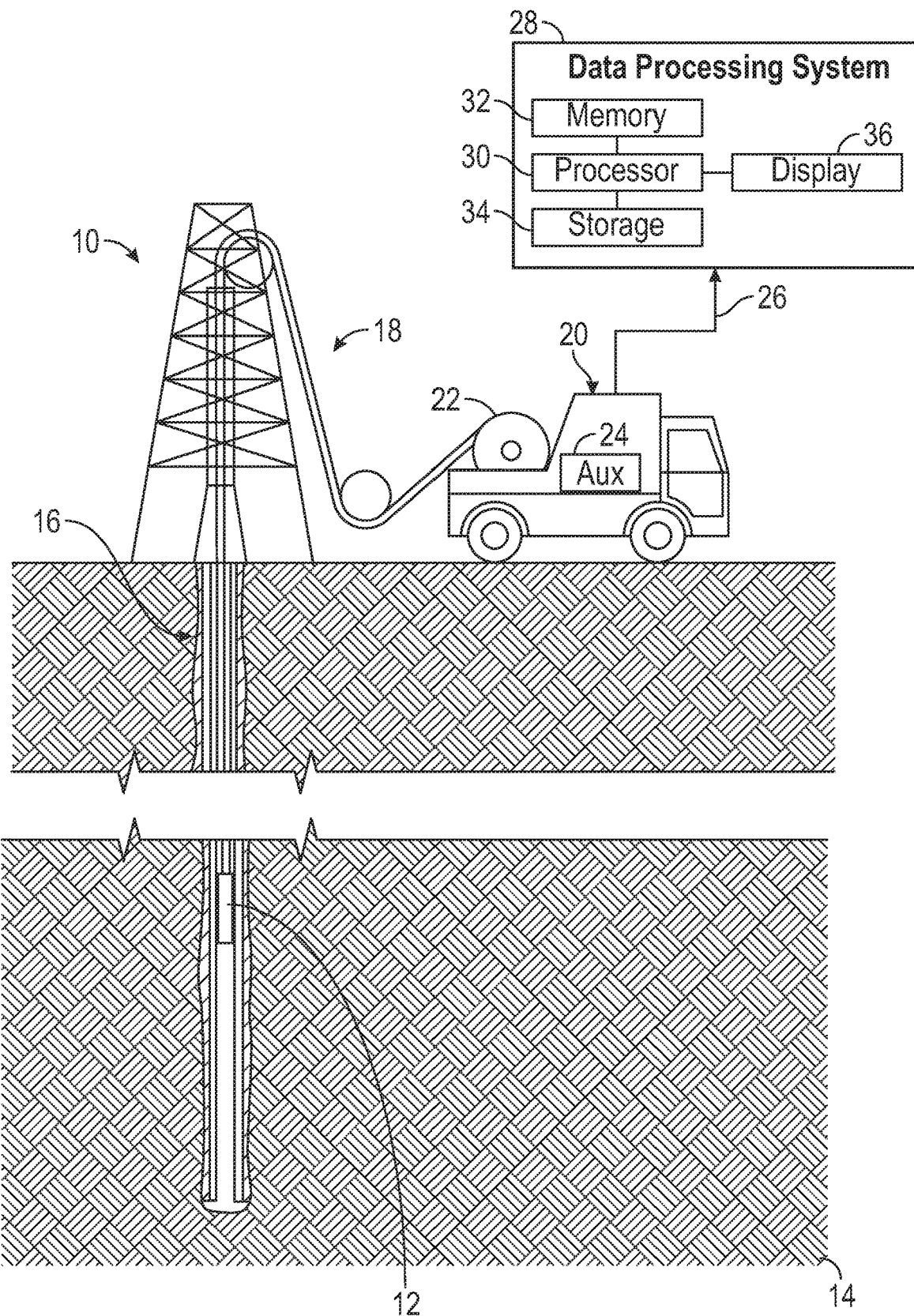
FIG. 1 is a schematic diagram of a well-logging system that may obtain induction measurements that may be used to identify formation resistivity and dielectric constant, in accordance with an embodiment.

One or more specific embodiments of the present disclosure will be described below.

These described embodiments are examples of the presently disclosed techniques. Additionally, in an effort to provide a concise description of these embodiments, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In general, oil and gas exploration organizations may make certain oil and gas production decisions, such as determining where to drill, based on well log data. One type of well log data that may inform such decisions are from induction well logging measurements. Certain techniques for obtaining and analyzing induction well logging measurements may have inaccuracies due to geological formations with bed boundary or dipping effects. Moreover, induction well logging measurements may be used to determine resistivity logs and resistivity anisotropy of reservoirs because in many or a majority of conventional reservoirs, the contribution of the displacement current to, or the dielectric effect on the data is so small that the dielectric constant may not be determined at the induction frequencies. However, when the dielectric effect in the geological formation is non-negligible, the resistivity log obtained based on induction well logging measurements with certain conventional techniques can be affected by the dielectric constant through the skin effect. For example, geological formations containing a relatively small amount of graphite or pyrite in artificial sand packs can cause a relatively large change in the dielectric constant and, thus, may decrease the accuracy of the resistivity log with certain conventional techniques.

One aspect of the present disclosure relates to systems and methods for using induction well logging measurements to generate a dielectric constant well log and resistivity well log of multilayer dipping rock formations. In some embodiments, the dielectric constant well log and resistivity well log may be generated based on minimizing a cost function based on a formation model, such as a one-dimensional (1D) formation model. The formation model may include a plurality of pixels or planes along a well path, such as a plurality of small layers along a wellbore. In some embodiments, each pixel at a region along the well path may have a constant conductivity or dielectric constant at a respective region. In some embodiments, aspects of the present disclosure may including performing a full-wave inversion method to simultaneously determining the dielectric constant and resistivity of the multilayer dipping rock formation using induction well logging data. It should be noted that, in accordance with aspects of the present techniques, the magnitude of the resultant dielectric constant suggests that the dielectric constant may be determined in shales and organic mudrocks with graphite or pyrite at reasonable accuracy using induction data.

With this in mind, FIG. 1 illustrates a well-logging system 10 that may employ the systems and methods of this disclosure. The well-logging system 10 may be used to convey a well-logging tool 12 through a geological formation 14 via a wellbore 16. The well-logging tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the well-logging tool 12.

Moreover, although the well-logging tool 12 is described as a wireline downhole tool, it should be appreciated that any suitable conveyance may be used. For example, the well-logging tool 12 may instead be conveyed as a logging-while-drilling (LWD) tool as part of a bottom hole assembly (BHA) of a drill string, conveyed on a slickline or via coiled tubing, and so forth. For the purposes of this disclosure, the well-logging tool 12 may be any suitable measurement tool that obtains NMR logging measurements through depths of the wellbore 16.

Many types of well-logging tools 12 may obtain induction logging measurements in the wellbore 16. These include, for example, the Rt Scanner, AIT, and Thrubit Induction tools by Schlumberger Technology Corporation, but induction logging measurements from other downhole tools by other manufacturers may also be used. The well-logging tool 12 may provide induction logging measurements 26 to a data processing system 28 via any suitable telemetry (e.g., via electrical signals pulsed through the geological formation 14 or via mud pulse telemetry). The data processing system 28 may process the induction logging measurements 26 to identify a conductivity and/or resistivity and dielectric constant at various depths of the geological formation 14 in the wellbore 16.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the induction logging measurements 26.

Figure 2:
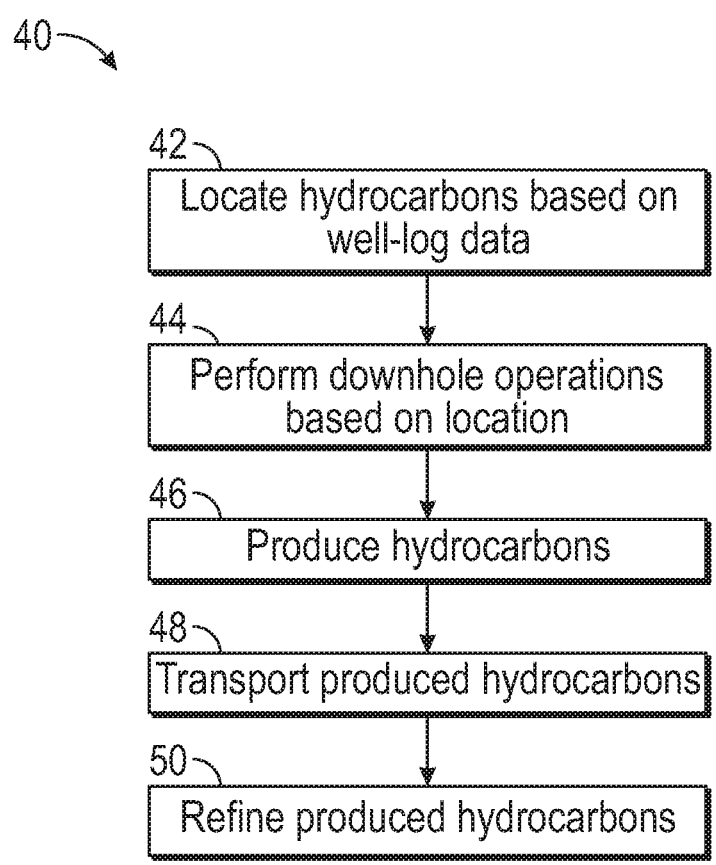
FIG. 2 illustrates a flow chart of various processes that may be performed based on analysis of induction well log data, in accordance with aspects of the present disclosure.

FIG. 2 illustrates a method 40 of various processes that may be performed based on analysis of well logs, in accordance with aspects of the present disclosure. A location of hydrocarbon deposits within a geological formation may be identified (process block 42) based on well-log data. In some embodiments, the well-log data may be analyzed to generate a map or profile that illustrates regions of interest with the geological formation.

Based on the identified locations and properties of the hydrocarbon deposits, certain downhole operations on positions or parts of the geological formation 14 may be performed (process block 44). That is, hydrocarbon exploration organizations may use the locations of the hydrocarbon deposits to determine locations in the wellbore to isolate for extracting liquid, frack, and/or drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 14, the hydrocarbons that are stored in the hydrocarbon deposits may be produced (block 46) via natural flowing wells, artificial lift wells, and the like. Further, the produced hydrocarbons may be transported (block 48) to refineries and the like via transport vehicles, pipelines, and the like. Further still, the produced hydrocarbons may be processed (block 50) according to various refining procedures to develop different products using the hydrocarbons.

It should be noted that the processes discussed with regard to the method 40 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

Accordingly, the systems and methods of this disclosure involve techniques to determine dielectric constant and resistivity (e.g., separately or simultaneously) in a multilayer formation using data acquired by an induction tool (e.g., induction well log measurements). A multilayer formation may have a number of sedimentary beds where the dielectric constant and resistivity vary from bed to bed. The bedding planes can be dipping relative to the tool plane. The inverse problem may be solved iteratively with a Gauss-Newton approach. The use of a maximum entropy and a first derivative or a variance of the model for regularization may cause the inversion to converge rapidly for a wide range of initial guesses. The regularization parameter may be chosen to be proportional to the data misfit to avoid the potential bias caused by the regularization terms.

The systems and methods of the present disclosure may include calculating the dielectric constant and resistivity of a region of geological formation that is free of bed boundary and dipping effects because the layering and dipping of the formation are considered in the one-dimensional (1D) formation model of the inversion. The dielectric constant obtained in this way can be used to estimate cation exchange capacity, which in turn can be used to yield an accurate hydrocarbon/water saturation in reservoirs containing shales. The dielectric constant can also be used to estimate the volume and maturity of kerogen in unconventional reservoirs, which in turn can be used to determine the type and volume of hydrocarbons in the reservoirs. The resistivity can be used in place of other induction resistivity logs where the dipping and/or dielectric effect are non-negligible. Moreover, the dielectric effect on a resistivity log obtained with other processing method may be removed using the systems and methods of this disclosure.

Figure 3:
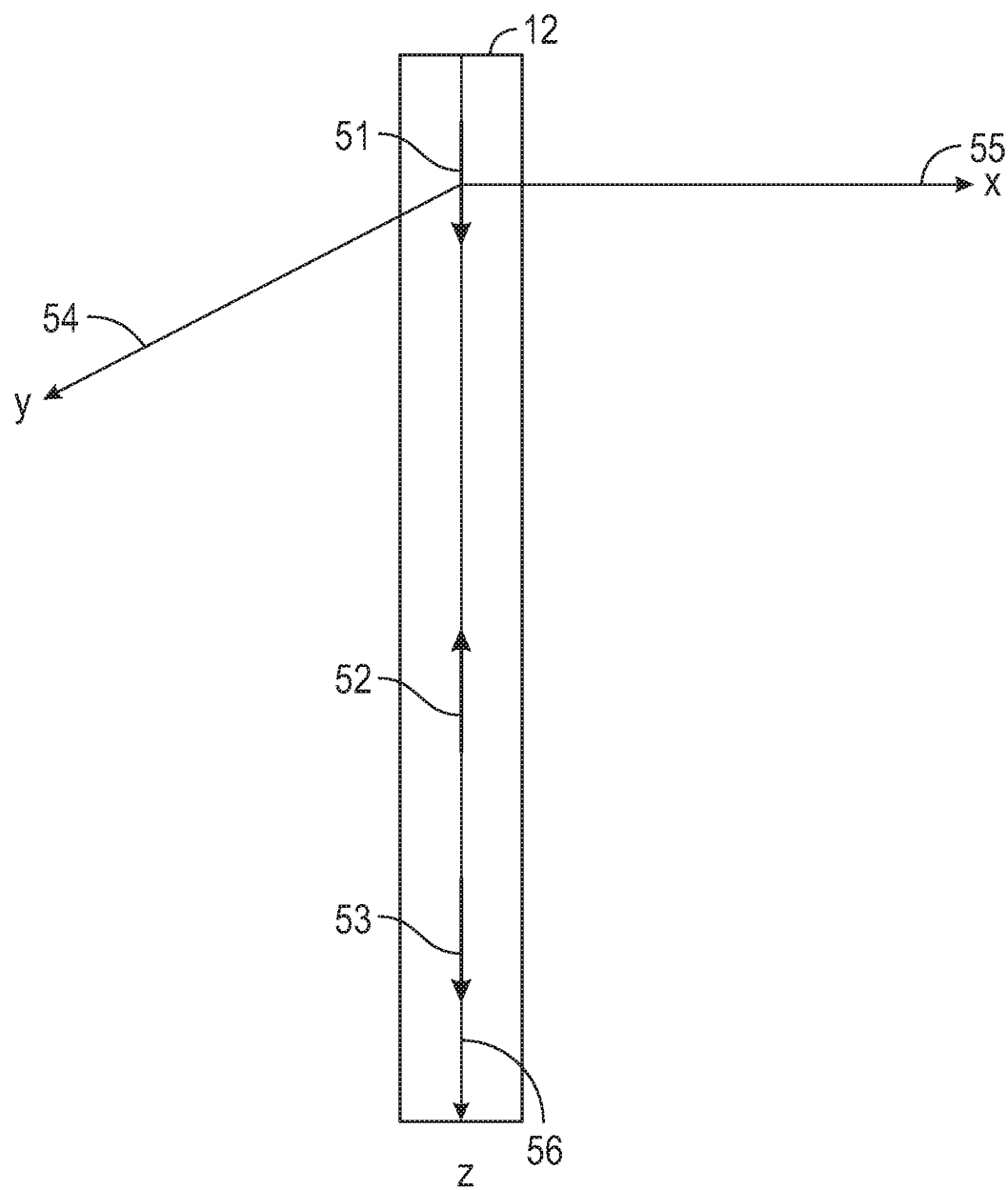
FIG. 3 is a schematic diagram of a downhole coaxial array that may be used to collect induction measurements, in accordance with an embodiment.
Figure 4:
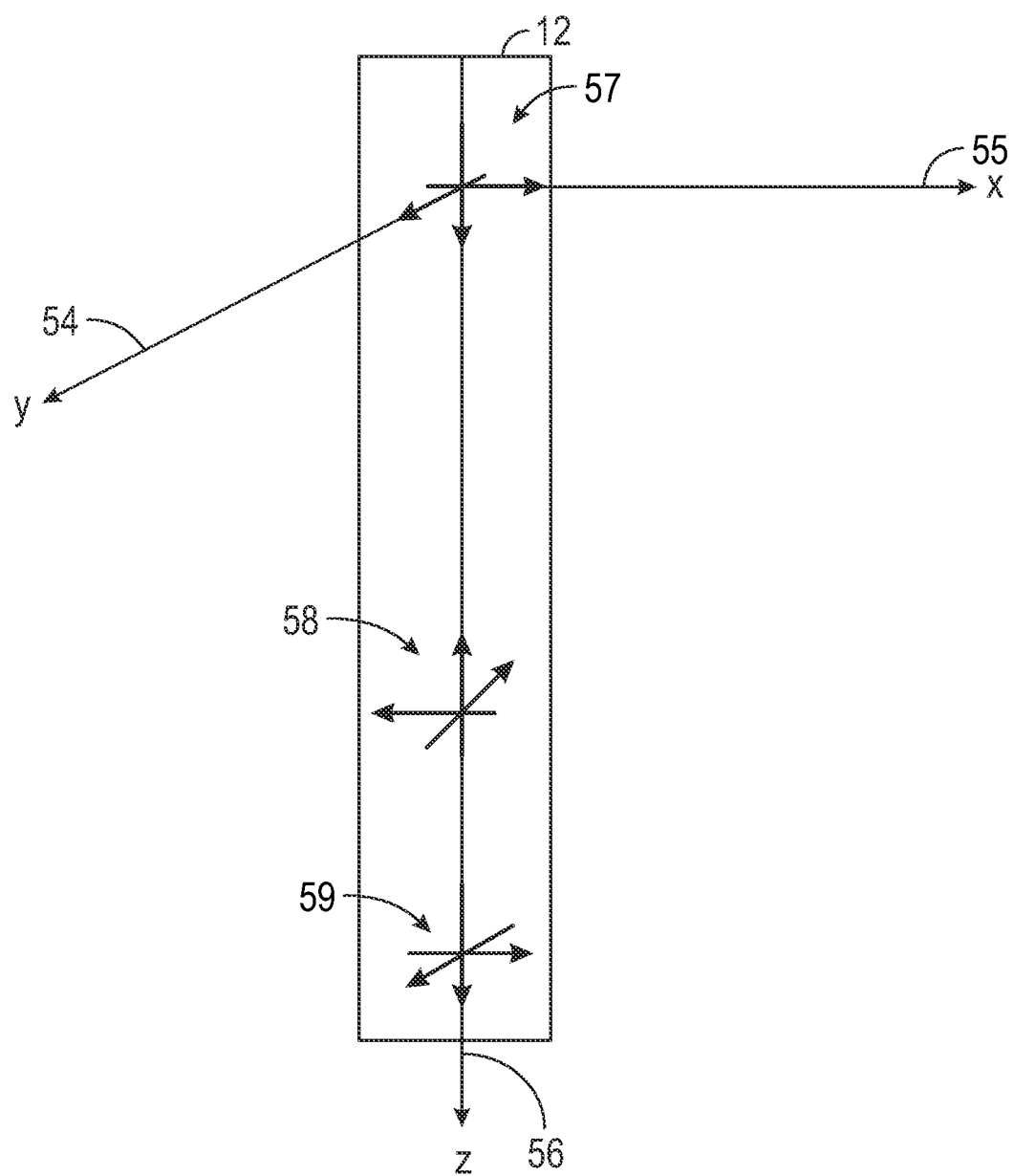
FIG. 4 is a schematic diagram of a downhole triaxial array that may be used to collect induction measurements, in accordance with an embodiment.

Examples of well-logging tools 12 that may acquire induction data are shown in FIGS. 3 and 4. The illustrated embodiment of the well-logging tool 12 shown in FIG. 3 includes an array induction tool (e.g., the AIT and Thrubit Induction tools by Schlumberger Technology Corporation) that measures coaxial couplings. As shown, the well-logging tool 12 in FIG. 3 includes a transmitter 51 (e.g., transmitter coil), a first receiver 52 (e.g., balancing receiver), and a second receiver 53. While the illustrated embodiment of the well-logging tool 12 shown in FIG. 3 includes one transmitter (e.g., transmitter 51) and two receivers (e.g., receiver 52), the number of transmitters and receivers is not a limit on the scope of the present invention.

FIG. 4 shows another example of an illustrated embodiment of the well-logging tool 12 that includes a triaxial induction tool (e.g., the Rt Scanner tool by Schlumberger Technology Corporation) with mutually orthogonal and collocated transmitter and receiver coils. As shown, the well-logging tool 12 in FIG. 4 includes three transmitters 57, three first receivers 58 (e.g., balancing receivers), and three second receivers 59 (e.g., main receivers). Generally speaking, the three transmitters 57 induce electric eddy current in the formation that flow parallel to orthogonal planes oriented with their normals in the X (e.g., along the axis 55), Y (e.g., along the axis 54), and Z directions (e.g., along the axis 56), which are defined by the directions of the magnetic dipole moments of each of the three transmitter coils. As such, the well-logging tool 12 shown in FIG. 4 may measure all nine orthogonal couplings to determine formation resistivity and resistivity anisotropy as well as formation dip. While the illustrated embodiment of the well-logging tool 12 shown in FIG. 4 includes one transmitter (e.g., transmitter 51) and two receivers (e.g., receiver 52), the number of transmitters 57 and receivers 58, 59 is not a limit on the scope of the present invention. It should be noted that inhomogeneties in the rock formations will distort the currents flowing therethrough, and the electromagnetic fields at the receivers 58 and 59 are different from what would have existed if the formation were homogeneous.

Wireline induction measurements in gas bearing organic mudrocks may have a quadrature or out-of-phase signal that include certain anomalies. Induction measurements in some over-mature gas bearing organic mudrocks have shown additional abnormalities (e.g., strange signals) where the in-phase conductivity is abnormally high. Certain conventional induction well logging techniques have attributed such behaviors to a presence of pyrite and/or graphite in the geological formation. However, it should be noted that the presence of a small amount of graphite or pyrite in artificial sand packs can cause a huge change in the dielectric constant and, in some instances, the resistivity. The magnitude of the resultant dielectric constant suggests that the dielectric constant can be determined in organic mudrocks with graphite or pyrite at reasonable accuracy using induction data.

To simulate the dielectric effect on induction data, the displacement current term may be added back to the Maxwell's equation, leading to a complex-valued conductivity:

$$\tilde{\sigma} = \sigma - i\omega\varepsilon_0\varepsilon_r \quad (1)$$

where $\sigma$, the first term, is the conductivity of the formation; $\varepsilon_r$ is the dielectric constant, and $\varepsilon_0$ is the electric permittivity of free space. In some embodiments, the time dependence is $\exp(-i\omega t)$, where $\omega$ is the angular frequency; $i$ is the imaginary unit, $i=\sqrt{-1}$.

Figure 5:
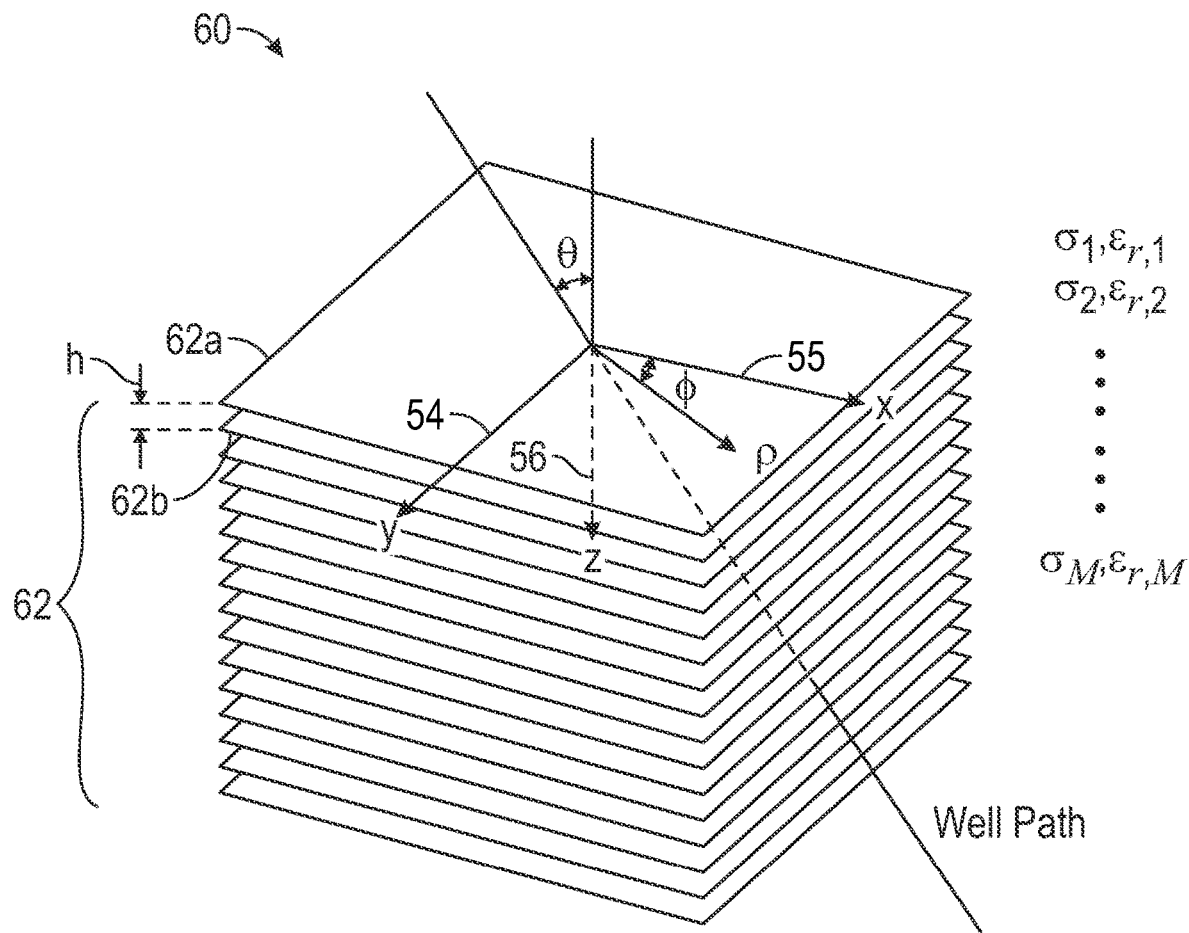
FIG. 5 is a schematic diagram of a one-dimensional (1D) formation model that may be used to ascertain conductivity or resistivity and dielectric constant, in accordance with an embodiment.

One output of the inversion may be formation conductivity or a dielectric constant based on the measurements acquired with an induction tool. In the inversion, the formation model may take a layered structure where conductivity and dielectric constant vary in one direction only, designated as the z-direction. FIG. 5 shows an illustration of a layered formation model 60, which may represent a 1D formation model adopted in the inversion. In general, the formation model assumes that the conductivity $\sigma$ and the dielectric constant $\varepsilon$, may vary in the z-direction (e.g., along axis 56), but are invariant in both along the x-direction (e.g., along axis 55) and y-directions (e.g., along axis 54). Angles $\theta$ and $\phi$ are the relative dip and azimuth of the well path. The varying conductivity $\sigma$ and dielectric constant $\varepsilon$, along the axis 56 is illustrated as multiple planes 62. In some embodiments, each plane 62 may be the top or bottom interface of a pixel of the formation model. For example, in the illustrated embodiment of the layered formation model 60 shown in FIG. 5, plane 62a is at a first position along the axis 56 and plane 62b is at a second position along the axis 56. Moreover, the pixel between the plane 62a and the plane 62b is assumed to have a constant conductivity and dielectric constant. The same is true with all other pixels in the model. It is worthy of note that the conductivity and dielectric constant may change from pixel to pixel.

Figure 6:
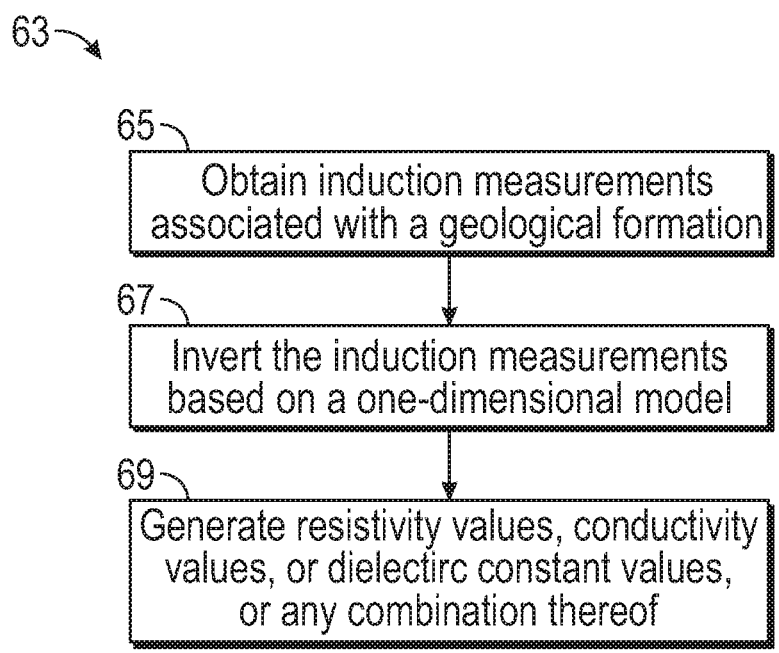
FIG. 6 is a flowchart of an inversion to determine conductivity or resistivity and dielectric constant, in accordance with an embodiment.

To help illustrate the above discussion, an example process 63 for determining physical properties associated with a geological formation in accordance with present disclosure is described in FIG. 6. Generally, the process 63 acquires (process block 65) induction measurements associated with a geological formation. For example, the induction measurements may be performed in real-time, such as by a data processing system 28 communicatively coupled to the well-logging tool 12 to acquire induction measurements.

The process 63 also includes inverting (process block 67) the induction measurements based on a one-dimensional model. In some embodiments, the one-dimensional model may assume that the conductivity and the dielectric constant varies in one direction, as discussed above with respect to FIG. 5. Further, in some embodiments, a cost function may be minimized based on an inversion. As discussed herein, the cost function may include one or more parameters related to physical properties of a geological formation, such as resistivity, conductivity, dielectric constant, and position within the geological formation. For example, the cost function may include a misfit term, an entropy term, and a smoothing term, as discussed in more detail below. In some embodiments, one or more of the terms (e.g., the misfit term, the entropy term, and the smoothing term) may be parameterized based on the varying conductivities and dielectric constants as defined by the model. Further, the process 63 may also include generating (process block 69) at least one of resistivity values, conductivity values or dielectric constant values based on the inverted formation model.

Although described in a particular order, which represents a particular embodiment, it should be noted that the process 63 may be performed in any suitable order. Additionally, embodiments of the process 63 may omit process blocks and/or include additional process blocks. Moreover, in some embodiments, the process 63 may be implemented at least in part by executing instructions stored in a tangible, non-transitory, computer-readable medium, such as memory 32 implemented in a data processing system 28, using processing circuitry, such as a processor 30 implemented in the data processing system 28.

In some embodiments, the cost function that the inversion minimizes may be given by:

$$\mathcal{L}(\sigma, \varepsilon_r) = \chi^2(\sigma, \varepsilon_r) - \gamma_P \mathcal{L}_P(\sigma, \varepsilon_r) + \gamma_S \mathcal{L}_S(\sigma, \varepsilon_r), \quad (2)$$

where:

$$\chi^2(\sigma, \varepsilon_r) = \int_{-\infty}^{\infty} dz \left\{ \left[ \frac{d_R(z; \sigma, \varepsilon_r) - d_R^{OBS}(z)}{\Delta_R} \right]^2 + \left[ \frac{d_X(z; \sigma, \varepsilon_r) - d_X^{OBS}(z)}{\Delta_X} \right]^2 \right\}, \quad (3)$$

$$\mathcal{L}_P(\sigma, \varepsilon_r) = -\int_{-\infty}^{\infty} dz \frac{\sigma(z)}{T_\sigma} \left[ \ln \frac{\sigma(z)}{\sigma_P(z)} - 1 \right] - \int_{-\infty}^{\infty} dz \frac{\varepsilon_r(z)}{T_\varepsilon} \left[ \ln \frac{\varepsilon_r(z)}{\varepsilon_{r,P}(z)} - 1 \right], \quad (4)$$

$$\mathcal{L}_S(\sigma, \varepsilon_r) = \int_{-\infty}^{\infty} dz \left[ \frac{d\sigma(z)}{dz} \right]^2 + \omega\varepsilon_0 \int dz \left[ \frac{d\varepsilon_r(z)}{dz} \right]^2, \quad (5)$$

where $\sigma$ and $\varepsilon_r$ are the true conductivity and dielectric constant of the formation to be determined with the inversion. The first term, the misfit term, on the right-hand side of Eq. (2) describes how well the simulated data matches the measured data, where $d_R^{OBS}$ and $d_X^{OBS}$ are real and imaginary parts of the measured apparent conductivity corresponding to the coaxial coupling of an induction tool; $d_R$ and $d_X$ are the simulated counterparts of $d_R^{OBS}$ and $d_X^{OBS}$, respectively. $d_R$ and $d_X$ are obtained rapidly with a fast forward solver for the 1D formation, $\Delta_R$ and $\Delta_X$ are the standard deviations of data noises for real and imaginary apparent conductivities, respectively. It should be noted that although in the current formulation, the data are assumed to be apparent conductivities, the data can also be measured voltages, or any other measurements that may be transformed from the measured voltages, e.g. phase shift and attenuation. If each datum is an independent random variable, the summation of the squared differences in Eq. (3)

obey a $\chi^2$ distribution. The second term of Eq. (2) is given in Eq. (4), which describes the entropy of the conductivity and dielectric constant models. Here, $T_\sigma$ and $T_\varepsilon$ are the averages of $\sigma$ and $\varepsilon_r$, respectively; $\sigma_P$ and $\varepsilon_{r,P}$ are the prior models for $\sigma$ and $\varepsilon_r$, respectively. At least in some instances, $T_\sigma = \sigma_P$, and $T_\varepsilon = \varepsilon_{r,P}$ may be used for the inversion. It should be noted that including the entropy term into the cost function may guide the inversion towards a solution (e.g., minimized cost function) that increases (e.g., maximizes) the entropy. The third term (e.g., smoothing term) of Eq. (2) is given in Eq. (5), which makes the inversion to preferentially look for a smoothing model among all feasible solutions. It should be understood that although the first derivative is used for the smoothing term, the inversion can use other properties of the model for the same effect. In one embodiment, the variance of the model can be used in place of the first derivative. In another embodiment, the second derivative can also be used to impose the smoothness on the model.

For numerical implementations, the cost function of Eq. (2) may be discretized, yielding:

$$\mathcal{L}(m_\sigma, m_\varepsilon) = \chi^2(m_\sigma, m_\varepsilon) - \gamma_P \mathcal{L}_P(m_\sigma, m_\varepsilon) + \gamma_S \mathcal{L}_S(m_\sigma, m_\varepsilon) \quad (6)$$

where $m_\sigma$ and $m_\varepsilon$ are two N-dimensional vectors of conductivities and dielectric constants of the truncated solution domain $[z_L, z_U]$ after being subdivided into N pixels with equal thickness, identified by h as shown in FIG. 4. The two vectors are given by $$m_\sigma = (\sigma_1, \sigma_2, \ldots, \sigma_N)^T \quad (7)$$

$$m_\varepsilon = \omega \varepsilon_0 (\varepsilon_{r,1}, \varepsilon_{r,2}, \ldots, \varepsilon_{r,N})^T \quad (8)$$

Here, the subscript T designates the operation of matrix transposition. Note that $m_\varepsilon$ corresponds to the imaginary part of the complex conductivity of Eq. (1). $m_\varepsilon$ is equivalent to the dielectric constant up to a constant of $\omega\varepsilon_0$. The discrete forms of the three terms in Eq. (6) are respectively:

$$\chi^2(m_\sigma, m_\varepsilon) = \|\overline{W}_R[d_R(m_\sigma, m_\varepsilon) - d_R^{OBS}]\|_2^2 + \|\overline{W}_X[d_X(m_\sigma, m_\varepsilon) - d_X^{OBS}]\|_2^2, \quad (9)$$

$$\mathcal{L}_P(m_\sigma, m_\varepsilon) = -\frac{m_\sigma^T}{\sigma_P}\left(\ln\frac{m_\sigma}{\sigma_P} - 1\right) - \frac{m_\varepsilon^T}{\omega\varepsilon_0\varepsilon_{r,P}}\left(\ln\frac{m_\varepsilon}{\omega\varepsilon_0\varepsilon_{r,P}} - 1\right), \quad (10)$$

$$\mathcal{L}_S(m_\sigma, m_\varepsilon) = \|\overline{D}m_\sigma\|_2^2 + \|\overline{D}m_\varepsilon\|_2^2 \quad (11)$$

In the above, $d_R^{OBS}$ and $d_X^{OBS}$ the real and imaginary parts of measured apparent conductivities acquired at M depth points, $$d_R^{OBS} = (d_{R,1}^{OBS} d_{R,2}^{OBS} \ldots d_{R,M}^{OBS})^T \quad (12)$$

$$d_X^{OBS} = (d_{X,1}^{OBS} d_{X,2}^{OBS} \ldots d_{X,M}^{OBS})^T \quad (13)$$

$d_R$ and $d_X$ are the real and imaginary parts of simulated apparent conductivities at the same depth points, $$d_R(m_\sigma, m_\varepsilon) = [d_{R,1}(m_\sigma, m_\varepsilon) d_{R,2}(m_\sigma, m_\varepsilon) \ldots d_{R,M}(m_\sigma, m_\varepsilon)]^T \quad (14)$$

$$d_X(m_\sigma, m_\varepsilon) = [d_{X,1}(m_\sigma, m_\varepsilon) d_{X,2}(m_\sigma, m_\varepsilon) \ldots d_{X,M}(m_\sigma, m_\varepsilon)]^T \quad (15)$$

matrices $\overline{W}_R$ and $\overline{W}_X$ are diagonal that may contain the inverses of standard deviations of the noises of real and imaginary apparent conductivities, $$\overline{W}_R = \text{diag}(\Delta_{R,1}^{-1} \Delta_{R,2}^{-1} \ldots \Delta_{R,M}^{-1}) \quad (16)$$

$$\overline{W}_X = \text{diag}(\Delta_{X,1}^{-1} \Delta_{X,2}^{-1} \ldots \Delta_{X,M}^{-1}) \quad (17)$$

in Eq. (10)

$$\ln\frac{m_\sigma}{\sigma_P} = \left(\ln\frac{\sigma_1}{\sigma_P} \ln\frac{\sigma_2}{\sigma_P} \ldots \ln\frac{\sigma_N}{\sigma_P}\right)^T, \quad (18)$$

$$\ln\frac{m_\varepsilon}{\omega\varepsilon_0\varepsilon_{r,P}} = \left(\ln\frac{\varepsilon_{r,1}}{\varepsilon_{r,P}} \ln\frac{\varepsilon_{r,2}}{\varepsilon_{r,P}} \ldots \ln\frac{\varepsilon_{r,N}}{\varepsilon_{r,P}}\right)^T, \quad (19)$$

and 1 is a constant vector, $1 = (1\ 1 \ldots 1)^T$. Matrix $\overline{D} \in R^{(N-1) \times N}$ in Eq. (11) is a difference operator, $$\overline{D} = \begin{pmatrix} -1 & 1 & & \\ & -1 & 1 & \\ & & \ddots & \\ & & -1 & 1 \end{pmatrix} \quad (20)$$

A Gauss-Newton method may be used to reduce (e.g., minimize) the cost function in Eq. (6) to find a solution (e.g., a best-fit solution) for conductivity $m_\sigma$ and dielectric constant $m_\varepsilon$. For the sake of conciseness of formulation, the following notations may be used:

$$m = (m_\sigma^T\ m_\varepsilon^T)^T, \quad (21)$$

$$d \equiv (d_R^T\ d_X^T)^T, \quad (22)$$

$$d^{OBS} = [(d_R^{OBS})^T\ (d_X^{OBS})^T]^T, \quad (23)$$

$$\overline{W}_D = \begin{pmatrix} \overline{W}_R & \overline{0} \\ \overline{0} & \overline{W}_X \end{pmatrix}. \quad (24)$$

In Eq. (24), $\overline{0} \in R^{M \times M}$ is a zero matrix. Supposing the current iterative step is l, the solution at this step is $$m_l = m_{l-1} + v_{l-1} q_{l-1} \quad (25)$$

where $q_{l-1}$ is the Newton search direction; $v_{l-1}$ is a step length to reduce the effect of approximation error caused by the quadratic approximation at the current step. The search vector may be given by $$q_{l-1} = -\overline{G}_{l-1}^{-1} g_{l-1} \quad (26)$$

where $g_{l-1}$ is the gradient of the cost function and $\overline{G}_{l-1}$ is its Hessian. They are given by $$g_{l-1} = J_{l-1}^T \overline{W}_D^T \overline{W}_D (d_{l-1} - d^{OBS}) - \gamma_r^{l-1} \nabla \mathcal{L}_P (m_{l-1}) + \gamma_S^{l-1} \nabla \mathcal{L}_S (m_{l-1}) \quad (27)$$

$$\overline{G}_{l-1} = J_{l-1}^T \overline{W}_D^T \overline{W}_D J_{l-1} + \gamma_P^{l-1} \nabla\nabla \mathcal{L}_P (m_{l-1}) + \gamma_S^{l-1} \nabla\nabla \mathcal{L}_S (m_{l-1}) \quad (28)$$

In the above two equations, $d_{l-1}$ is the simulated data corresponding to the model $m_{l-1}$ obtained at the previous step; $J_{l-1}$ is the Jacobian of the data term $\chi^2$ of the cost function, evaluated at $m = m_{l-1}$. $\nabla \mathcal{L}_P$ and $\nabla \mathcal{L}_S$ are the gradients of the maximum entropy and the smoothing terms in Eq. (6), respectively. $\nabla\nabla \mathcal{L}_P$ and $\nabla\nabla \mathcal{L}_S$ are their Hessians, respectively. A form of these four gradients and Hessians may be derived from $\mathcal{L}_P$ and $\mathcal{L}_S$ in Eqs. (10) and (11). The two regularization parameters, $\gamma_P$ and $\gamma_S$, may be dynamically adjusted with $\chi^2$ during the iteration such that:

$$\gamma_P^{l-1} = \delta_P \chi^2(m_{l-1}) \quad (29)$$

$$\gamma_S^{l-1} = \delta_X \chi^2(m_{l-1}) \quad (30)$$

where $\chi^2$ ($m_{l-1}$) is the data misfit evaluated at $m=m_{l-1}$, the model obtained at the previous step. Numerical experiments show that setting $\delta_P$ and $\delta_S$ to 1 is an appropriate choice for both synthetic and field data processing. Once the search direction is determined from Eq. (26), a linear search follows to determine the steplength $v_{l-1}$.

Jacobian $J_{l-1} \in R^{2M \times 2N}$ contains the first derivatives of $d_R$ and $d_X$ with respect to pixel conductivities and dielectric constants, evaluated at $m=m_{l-1}$. It is given by $$J_{l-1} = \begin{pmatrix} \frac{\partial d_R}{\partial m_\sigma} & \frac{\partial d_R}{\partial m_\varepsilon} \\ \frac{\partial d_X}{\partial m_\sigma} & \frac{\partial d_X}{\partial m_\varepsilon} \end{pmatrix}\bigg|_{m=m_{l-1}} \quad (31)$$

Where:

$$\frac{\partial d_\eta}{\partial x} = \begin{pmatrix} \frac{\partial d_{\eta,1}}{\partial x_1} & \frac{\partial d_{\eta,1}}{\partial x_2} & \cdots & \frac{\partial d_{\eta,1}}{\partial x_N} \\ \frac{\partial d_{\eta,2}}{\partial x_1} & \frac{\partial d_{\eta,2}}{\partial x_2} & \cdots & \frac{\partial d_{\eta,2}}{\partial x_N} \\ \vdots & \vdots & \ddots & \vdots \\ \frac{\partial d_{\eta,M}}{\partial x_1} & \frac{\partial d_{\eta,M}}{\partial x_2} & \cdots & \frac{\partial d_{\eta,M}}{\partial x_N} \end{pmatrix}, \eta = R, X; x = m_\sigma, m_\varepsilon \quad (32)$$

In some embodiments, the derivatives of $d_R$ and $d_X$ with respect to conductivities of pixels may be computed with an analytical approach or using a finite difference approximation. Instead of computing them directly, the derivatives with respect to dielectric constants may be derived from those with respect to conductivities. Making use of the Born's approximation, the following relationships may be obtained:

$$\frac{1}{\omega \varepsilon_0} \frac{\partial d_{R,j}}{\partial \varepsilon_{r,k}} = \frac{\partial d_{X,j}}{\partial \sigma_k}, \quad (33)$$

$$\frac{1}{\omega \varepsilon_0} \frac{\partial d_{X,j}}{\partial \varepsilon_{r,k}} = -\frac{\partial d_{R,j}}{\partial \sigma_k}, \quad (34)$$

for real and imaginary data at the j-th depth point and conductivity and dielectric constant of pixel k. They can be written in vector form as $$\frac{\partial d_R}{\partial m_\varepsilon} = \frac{\partial d_X}{\partial m_\sigma} \quad (35)$$

$$\frac{\partial d_X}{\partial m_\varepsilon} = -\frac{\partial d_R}{\partial m_\sigma} \quad (36)$$

Substituting Eqs. (35) and (36) in Eq. (31) yields $$J_{l-1} = \begin{pmatrix} \frac{\partial d_R}{\partial m_\sigma} & \frac{\partial d_X}{\partial m_\sigma} \\ \frac{\partial d_X}{\partial m_\sigma} & -\frac{\partial d_R}{\partial m_\sigma} \end{pmatrix}\bigg|_{m=m_{l-1}} \quad (37)$$

The use of the Jacobian in Eq. (37) expedites the inversion by nearly a factor of two compared to using the Jacobian in Eq. (31). The stopping criteria for the inversion may be $\chi^2 < M_f$ and $l > l_{max}$, where l is the index for iteration step. $M_f$ is the number of degrees of freedom, $M_f = 2M$ if all data are independent random variables. In one example of the inversion, $1_{max}$, the maximum number of iterations, is set to 50, but any other suitable maximum number of iterations may be used.

Figure 7:
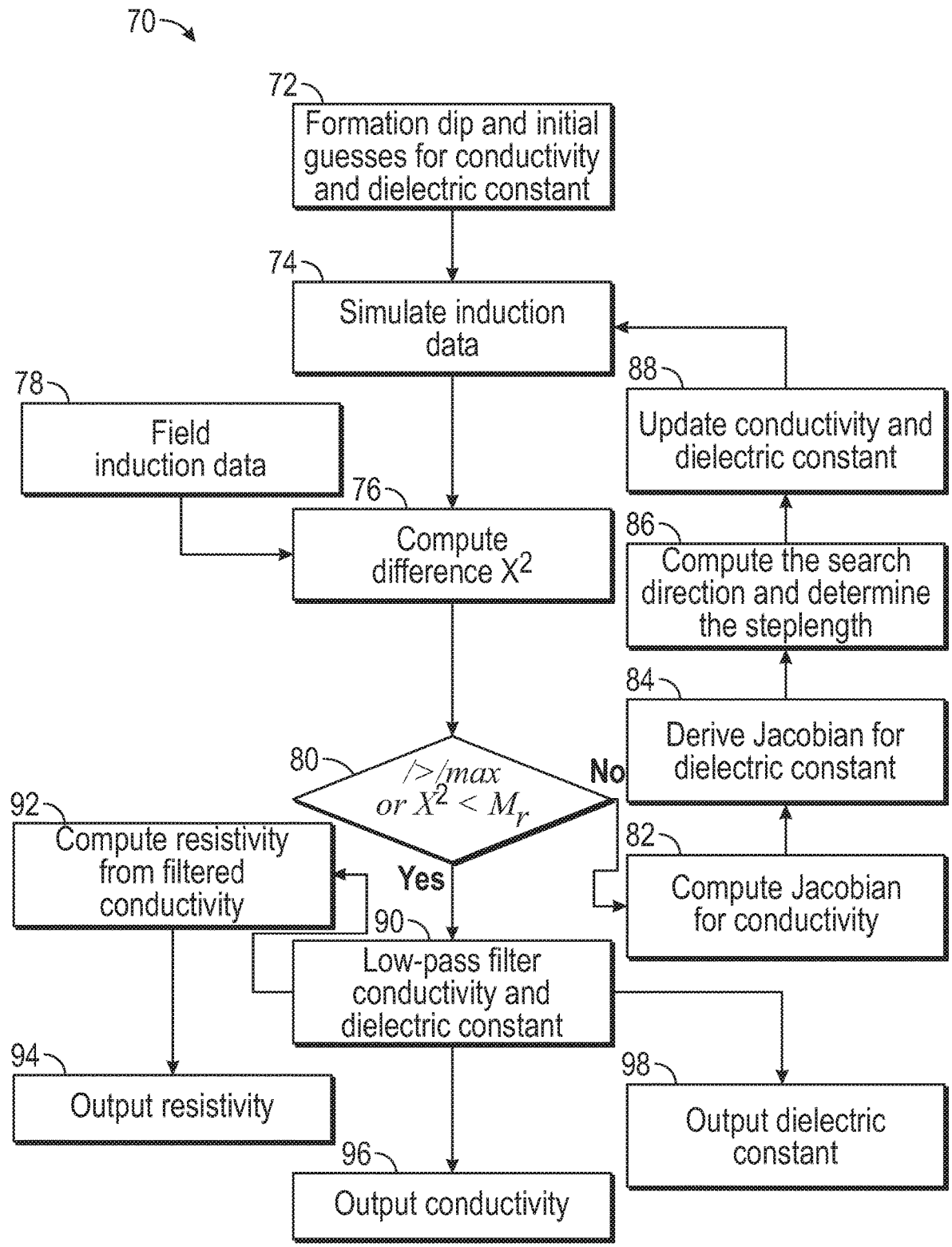
FIG. 7 is a flowchart of an inversion to determine conductivity or resistivity and dielectric constant, in accordance with an embodiment.

To help illustrate the above discussion, an example process 70 for determining a dielectric constant and resistivity measurements in accordance with present disclosure is described in FIG. 7. Generally, the process 70 includes providing formation dip and initial guesses for conductivity and dielectric constant (process block 72), simulating induction data (process block 74), computing difference in $\chi^2$ (process block 76) based on received field induction data 78, and determining whether the inversion meets the stopping criteria (process block 80). The process 70 includes computing a Jacobian for conduction (process block 82) when the inversion does not meet the stopping criteria, deriving a Jacobian for a dielectric constant (process block 84), computing a search direction and determining a step length (process block 86), and updating the conductivity and dielectric constant (process block 88) and continuing with process block 74.

When the inversion does meet the stopping criteria, the process 70 includes applying a low-pass filter to the conductivity and the dielectric constant (90), computing resistivity from filtered conductivity (process block 92) to output the resistivity 94, outputting the conductivity 96, and outputting the dielectric constant 98.

Although described in a particular order, which represents a particular embodiment, it should be noted that the process 70 may be performed in any suitable order. Additionally, embodiments of the process 70 may omit process blocks and/or include additional process blocks. Moreover, in some embodiments, the process 70 may be implemented at least in part by executing instructions stored in a tangible, non-transitory, computer-readable medium, such as memory 32 implemented in a data processing system 28, using processing circuitry, such as a processor 30 implemented in the data processing system 28.

In some embodiments, some variants can be derived from the formulation in the above to further enhance the performance of the inversion. For instance, instead of inverting for $\sigma$ and $\varepsilon_r$, one may choose to invert for the logarithms of $\sigma$ and $\omega \varepsilon_0 \varepsilon_r$. To accommodate the transforms, the Maximum entropy term in Eq. (4) can be modified to:

$$\mathcal{L}_P(\sigma, \varepsilon_r) = -\int_{-\infty}^{\infty} dz \frac{\ln\sigma(z) + \gamma_\sigma}{\ln T_\sigma + \gamma_\sigma}\left[\ln\frac{\ln\sigma(z) + \gamma_\sigma}{\ln\sigma_P(z) + \gamma_\sigma} - 1\right] - \int_{-\infty}^{\infty} dz \frac{\ln\varepsilon_r(z) + \gamma_\varepsilon}{\ln T_\varepsilon + \gamma_\varepsilon}\left[\ln\frac{\ln\varepsilon_r(z) + \gamma_\varepsilon}{\ln\varepsilon_{r,P}(z) + \gamma_\varepsilon} - 1\right] \quad (37)$$

where $\gamma_\sigma, \gamma_\varepsilon$ are two positive numbers to prevent the denominators from being vanishingly small. Accordingly, the smoothing term in Eq. (5) can be modified to $$\mathcal{L}_S(\sigma, \varepsilon_r) = \int_{-\infty}^{\infty} dz \left[\frac{d\ln\sigma(z)}{dz}\right]^2 + \int dz \left[\frac{d\ln\varepsilon_r(z)}{dz}\right]^2. \quad (38)$$

To facilitate numerical implementations, if a zone to be processed is long, the zone may be first subdivided into a sequence of short intervals. The inversion may be run on each interval separately in serial or in parallel. The results of all intervals may be combined to obtain an output. In one example, each interval may be 30 ft with a transition zone of 25 ft on both sides. The relative dip θ, or the angle made by the tool axis and the normal to the bedding planes, may be assumed to be already known and therefore may be fixed in the inversion. It can be obtained with borehole image data or some advanced electromagnetic measurements (e.g., tri-axial induction data). Upon output, σ and $\varepsilon_r$ that are obtained at the last iteration or any other iteration may be low-pass filtered to remove any undesirable spikes before being delivered as the final solution. For example, a Gaussian filter with a standard deviation of 0.35 ft may be used as the low pass filter, but any other suitable low-pass filter may be used. In addition to σ, resistivity is also provided as a reciprocal of the filtered conductivity, denoted as R. σ and R reflect the collective effect of both formation and conductive inclusions such as graphite flakes or pyrite particles. The resolution of σ and R, although potentially significantly higher than that of apparent conductivity, is dependent on the tool spacing. For an induction tool with a spacing of 72 in from transmitter to main receiver, when the bed thickness is larger than 2 ft, σ and R can read the true formation conductivity and dielectric constant free of bed boundary and dip effects. Moreover, in comparison to apparent conductivity, there may be reduced or no skin effect and reduced or no distortion in σ and R caused by the real part of dielectric constant, which may be already corrected in the inversion together with the bed boundary and dip effects.

Numerical Results

FIGS. 8-11 represent example induction well logs obtained using the inversion process as discussed herein. As discussed further below, the inversion of this disclosure has proven successful in a number of situations.

I. Chirp Models.

The chirp models include an alternating sequence of resistive and conductive beds with gradually increasing thickness from top to bottom. In this example, the first bed on the very top is 0.5 ft; the last one at the bottom is 6 ft. The others in between are 1, 2, 4 and 6 ft, respectively from top to bottom. All the resistive beds have a resistivity of 100 ohm·m, and all the conductive ones a resistivity 2 ohm·m. The dielectric constants for the first model are 50,000 and 500 for the resistive and conductive beds, respectively. The second model is similar to the first one except that the dielectric constant is set to one in the entire interval. The data for the inversion may be acquired with the simulation of measurements of an induction tool with a spacing of 72 in from transmitter to main receiver.

Figure 8:
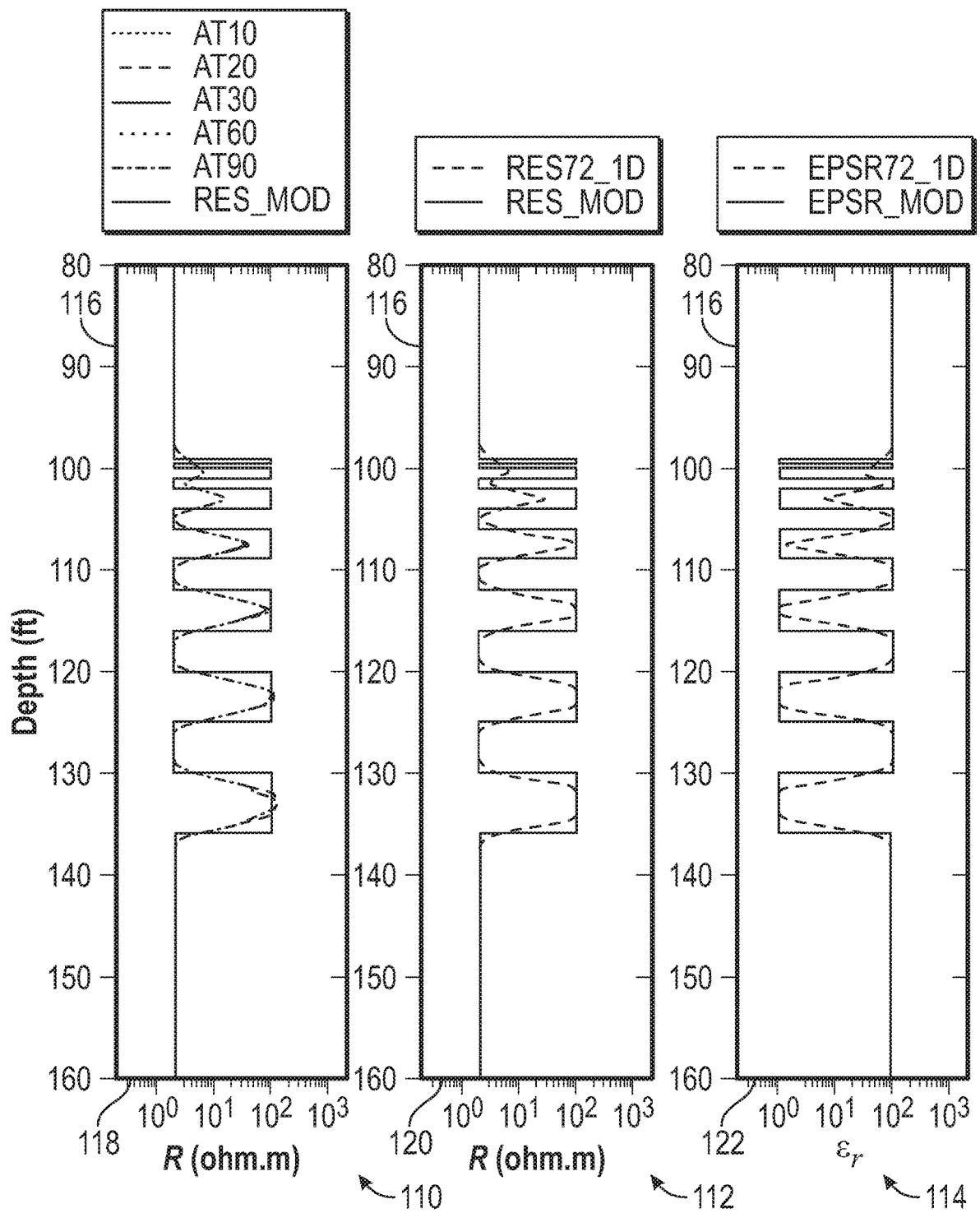
FIG. 8 is an example well log of resistivity and dielectric constant determined with inversion in a chirp model in the presence of large dielectric effect, in accordance with an embodiment.

FIG. 8 shows three panels 110, 112, 114 displaying well log data related to induction well logging measurements based on a first model having a first dielectric constant. The well log data of each panel 110, 112, and 114 is depth (e.g., axis 116) versus a respective set of logs (e.g., axes 118, 120, and 122). Panel 110 depicts depth versus resistivity obtained with the standard processing, panel 112 depicts depth versus resistivity obtained using the inversion process as discussed herein, and panel 114 depicts depth versus dielectric constant obtained using the inversion process as discussed herein.

Figure 9:
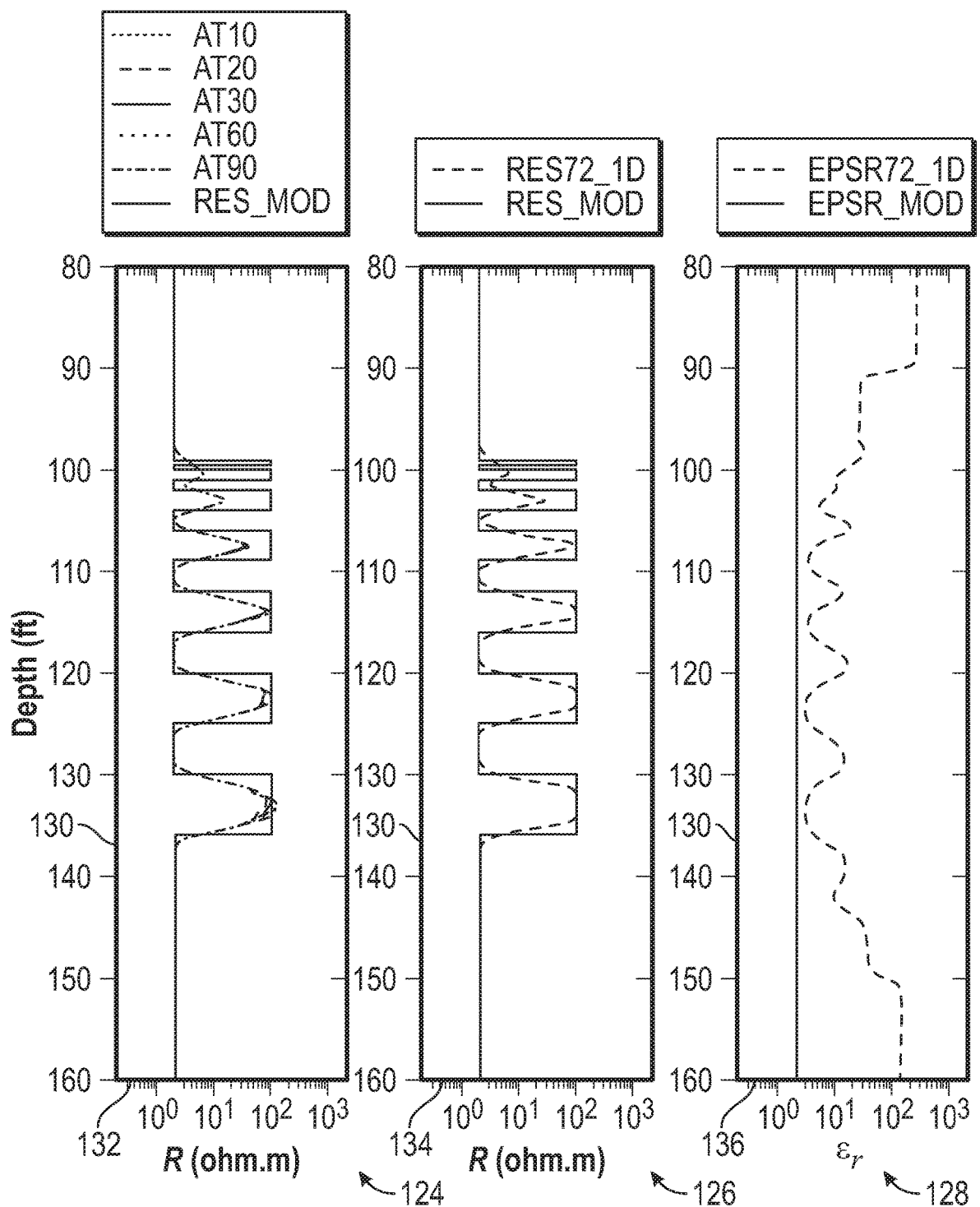
FIG. 9 is an example well log of resistivity and dielectric constant determined with inversion in a chirp model in the absence of large dielectric effect, in accordance with an embodiment.

For the first model in FIG. 8, comparing inversion-derived R and $\varepsilon_r$ with their true values (square logs) shows that the inversion can resolve a bed as thin as 2 ft. When the bed is 3 ft or larger, the readings of R and $\varepsilon_r$ at the middle of the bed may be similar or identical to their true values. The inversion can barely see the 1-ft bed near the top of the interval, and completely misses the 0.5 ft bed on the very top. The same observations are made for R for the second model as shown in FIG. 9, where the dielectric effect is negligible. However, the inversion-derived $\varepsilon_r$ is completely different from the true $\varepsilon_r$. The significant difference illustrates the limit of the inversion for determining dielectric constant from induction data. Dielectric constant can be viewed as the imaginary part of a complex conductivity with reference to Eq. (1). An imaginary conductivity of 1 mS/m corresponds to a dielectric constant of 690 for a frequency of 26 kHz. The principle of induction measurements suggests that when the dielectric constant is small, the induction data is not sensitive enough to warrant a reliable estimation of dielectric constant. One lower limit for dielectric constant may be 1000.

FIG. 9 shows three panels 124, 126, and 128 displaying well log data related to induction well logging measurements based on a second model having a second dielectric constant. The well log data of each panel 124, 126, and 128 is depth (e.g., axis 130) versus a respective set of logs (e.g., axes 132, 134, and 136). Panel 124 depicts depth versus resistivity obtained with the standard processing, panel 126 depicts depth versus resistivity obtained using the inversion process as discussed herein, and panel 128 depicts depth versus dielectric constant obtained using the inversion process as discussed herein.

For the second model, the true dielectric constant takes the value of one in the interval. Because of the low sensitivity, the dielectric constant obtained with the inversion can be anywhere from 1 to 300. For field data processing, the lower limit of dielectric constant in the inversion is set to the value corresponding to a conductivity of 1 mS/m for a given induction tool. It is worth noting the difference of array induction logs for the two models. Close examination shows that the resistivities of the logs for the first model (e.g., shown in FIG. 8) with large dielectric constant are slightly higher than those for the second model (e.g., shown in FIG. 9). The increase may be attributed to the scheme for skin effect correction used in obtaining the array induction logs. In contrast, inspection of two inversion-derived resistivity logs shows that the readings are nearly the same regardless of dielectric constant. In other words, the inversion-derived resistivity log is free of dielectric effect.

II. Modified Oklahoma Model.

Figure 10:
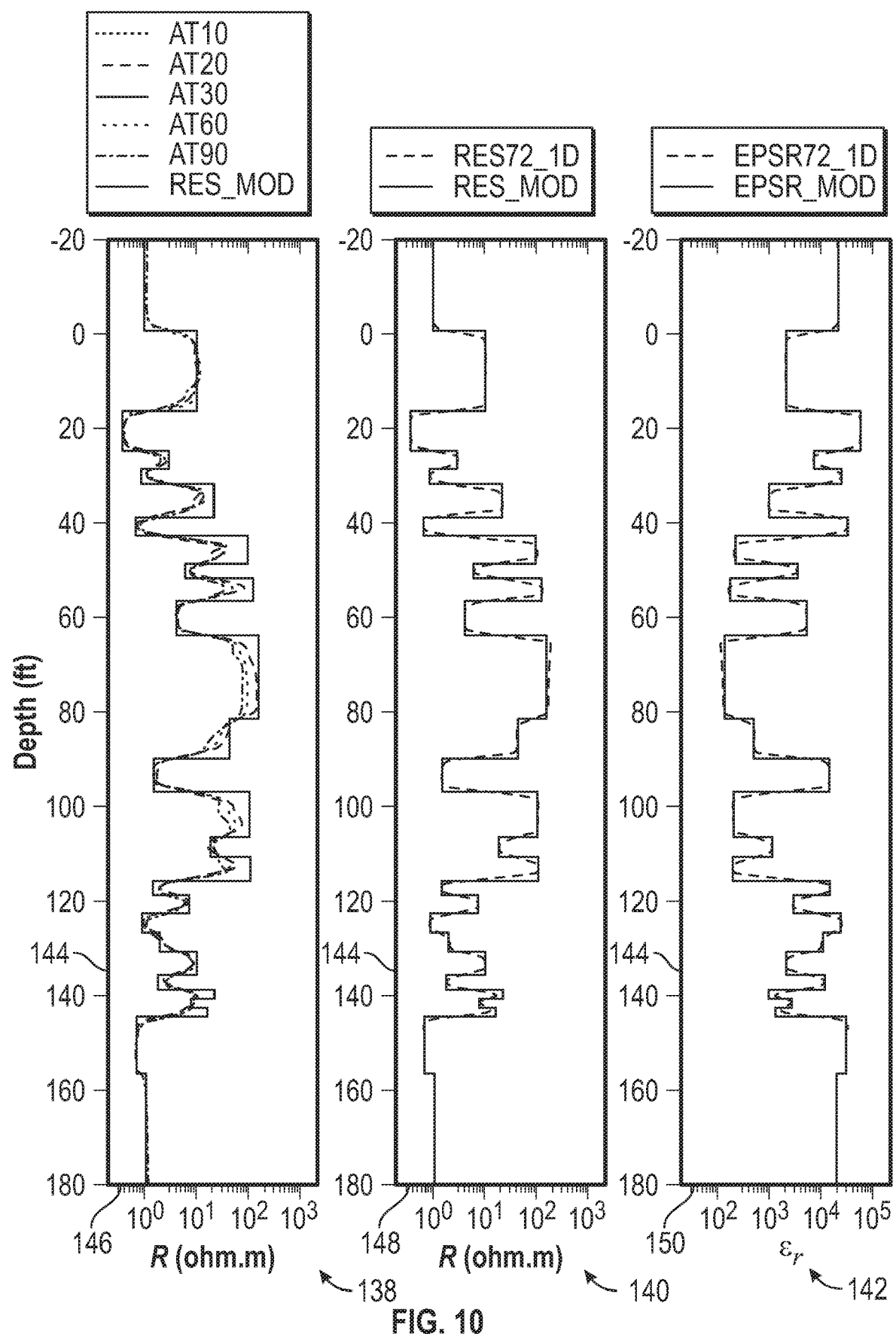
FIG. 10 is an example well log of resistivity and dielectric constant determined with inversion in a modified Oklahoma model of a relative dip of 30 degrees, in accordance with an embodiment.
Figure 11:
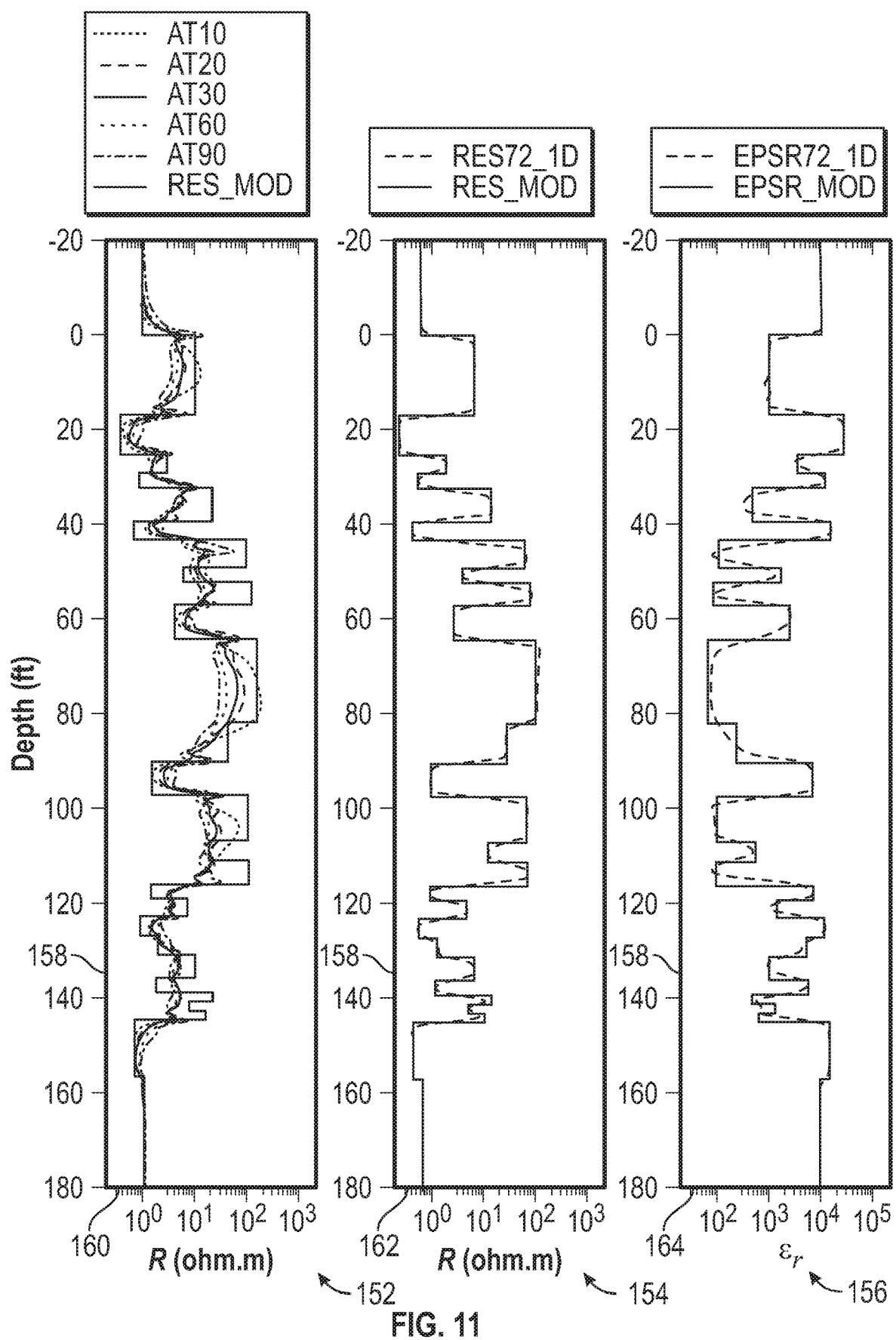
FIG. 11 is an example well log of resistivity and dielectric constant determined with inversion in a modified Oklahoma model of a relative dip of 60 degrees, in accordance with an embodiment.

A modified Oklahoma model is made by adding a dielectric constant to the Oklahoma model that is often used to test the performance of inversion methods. The model is described in more detail in Table 1. Example well logs involving the modified Oklahoma model are shown in FIGS. 10 and 11. The positions of the bed boundaries are defined along the well path in the tool coordinates. When the relative dip of the formation is zero, the bed thickness computed with the positions of bed boundaries is similar or identical to the true thickness of a given bed. Otherwise, it should be understood as the apparent thickness of the given bed.

TABLE 1

The modified Oklahoma model

| No. | z (ft) | R (ohm · m) | $\varepsilon_r$ |
|---|---|---|---|
| 1 | 0 | 1 | 100000 |
| 2 | 17 | 10 | 10000 |
| 3 | 25 | 0.4 | 250000 |
| 4 | 29 | 3 | 33333 |
| 5 | 32 | 0.9 | 111111 |
| 6 | 39 | 20 | 5000 |
| 7 | 43 | 0.7 | 142857 |
| 8 | 49 | 90 | 1111 |
| 9 | 52 | 6 | 16667 |
| 10 | 57 | 120 | 833 |
| 11 | 64 | 4 | 25000 |

TABLE 1-continued

The modified Oklahoma model

| No. | z (ft) | R (ohm · m) | $\varepsilon_r$ |
|---|---|---|---|
| 12 | 82 | 150 | 667 |
| 13 | 90 | 40 | 2500 |
| 14 | 97 | 1.5 | 66667 |
| 15 | 107 | 100 | 1000 |
| 16 | 111 | 18 | 5556 |
| 17 | 116 | 100 | 1000 |
| 18 | 119 | 1.5 | 66667 |
| 19 | 123 | 7.5 | 13333 |
| 20 | 127 | 0.9 | 111111 |
| 21 | 131 | 2 | 50000 |
| 22 | 136 | 10 | 10000 |
| 23 | 139 | 1.8 | 55556 |
| 24 | 141 | 20 | 5000 |
| 25 | 143 | 7.5 | 13333 |
| 26 | 145 | 15 | 6667 |
| 27 | 157 | 0.7 | 142857 |
| 28 | ∞ | 1.1 | 90909 |

FIG. 10 shows three panels 138, 140, and 142 displaying resistivity and dielectric constant determined with the inversion in the modified Oklahoma model of a relative dip of 30 degrees. The well log data of each panel 138, 140, and 142 is depth (e.g., axis 144) versus a respective set of logs (e.g., axes 146, 148, and 150). Panel 138 depicts depth versus resistivity obtained with the standard processing, panel 140 depicts depth versus resistivity obtained using the inversion process as discussed herein, and panel 142 depicts depth versus dielectric constant obtained using the inversion process as discussed herein.

More specifically, two-foot standard array induction resistivity logs are displayed in left panel as reference. In this first case, the relative dip of the modified Oklahoma model is 30 deg. The value of the dip is fed to the inversion and is fixed in the inversion. As in the chirp models, the data of the 72 in. induction tool is used to solve for conductivity and dielectric constant. The results are displayed in FIG. 10. The resistivity R and dielectric constant $\varepsilon_r$ obtained with the inversion are displayed in the panel 140 and the panel 142. The two-foot array induction resistivity logs are displayed in the left panel as reference. The square logs (e.g., 'RES_MOD') in the panel 138 and the panel 140 are the true resistivity of the formation. The square log (e.g., 'ESPR_MOD') in the panel 142 is the true dielectric constant of the formation. Both the resistivity and dielectric constant logs obtained with the inversion can well resolve the three thin layers located below 139 ft. and above 145 ft. The two-foot induction resistivity logs can hardly see the three layers. Above 139 ft., the reading of the inversion-derived resistivity log is nearly the same as the true resistivity at the middle of each bed. In contrast, the two-foot standard induction resistivity logs read consistently lower than the true resistivity when the bed is less than 5 ft., which may be attributed to the coexistence of dipping and dielectric effect. Comparison of inversion-derived resistivity and dielectric constant shows the two logs behave similarly and have similar resolution.

FIG. 11 shows three panels 152, 154, and 156 displaying resistivity and dielectric constant determined with the inversion in the modified Oklahoma model of a relative dip of 60 degrees. The well log data of each panel 152, 154, and 156 is depth (e.g., axis 158) versus a respective set of logs (e.g., axes 160, 162, and 164). Panel 152 depicts depth versus resistivity obtained with the standard processing, panel 154 depicts depth versus resistivity obtained using the inversion process as discussed herein, and panel 156 depicts depth versus dielectric constant obtained using the inversion process as discussed herein.

More specifically, two-foot standard array induction resistivity logs are displayed in the panel 152 as reference. In FIG. 11, the relative dip of the modified Oklahoma model is increased to 60 deg. As a result, the true thicknesses of the beds are reduced to a half of those computed with the bed boundaries in Table 1. To compensate for the lack of high frequency information of the 72 inch induction tool, the data of a 39 inch induction tool may be used in addition to the data of the former, which can partially offset the influence of the decrease of the true bed thicknesses. The results are displayed in FIG. 11. As with FIG. 10, the resistivity R and dielectric constant $\varepsilon_r$ obtained with the inversion are displayed in the panel 154 and the panel 156. The square logs (e.g., 'RES_MOD') in the panel 152 and the panel 154 are the true resistivity of the formation. The square log (e.g., 'ESPR_MOD') in the panel 156 is the true dielectric constant of the formation. Comparison of the inversion-derived resistivity R and dielectric constant $\varepsilon_r$ shows that the resolution of the resistivity log is slightly better than that of the dielectric constant log. The dielectric constant log (e.g., 'ESPR72_1D') fails to resolve the three thin layers in the interval from 139 ft to 145 ft, as indicated by the dielectric constant log in the panel 156 being outside and not overlapping the green square log in the panel 156. However, the resistivity log can still distinguish between the three layers. The two-foot standard induction resistivity logs are strongly affected by the dipping and bed boundary effect. In contrast, the inversion-derived resistivity R and dielectric constant $\varepsilon_r$ are free of dipping and bed boundary effect.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
    obtaining induction measurements in a wellbore through a geological formation using one or more downhole induction well-logging tools;
    inverting the induction measurements based on a one-dimensional model comprising a plurality of geological layers; wherein each geological layer of the plurality of geological layers comprises a respective conductivity value and a respective dielectric constant value, and wherein inverting the induction measurements is based on a partial derivative of a simulated real apparent conductivity and a simulated imaginary apparent conductivity associated with the respective conductivity values and the respective dielectric constant values of the plurality of geological layers; and
    generating resistivity and dielectric constant values of the geological formation based on the output of the inversion of induction measurements.

2. The method of claim 1, wherein partial derivatives of a simulated real apparent conductivity and a simulated imaginary apparent conductivity with respect to dielectric constant are obtained with partial derivatives of the simulated real and imaginary apparent conductivities with respect to conductivity.

3. The method of claim 1, comprising outputting a resistivity well log based on the resistivity values, a dielectric well log based on the dielectric constant values, or both.

4. The method of claim 1, wherein the induction measurements are inverted based on minimizing a cost function comprising a misfit term, an entropy term, and a smoothing term.

5. The method of claim 4, wherein the misfit term, the entropy term, and the smoothing term are each dependent on a conductivity and a dielectric constant of each of the plurality of geological layers.

6. The method of claim 4, wherein the cost function is minimized based on a Gauss-Newton method.

7. The method of claim 6, wherein the Gauss-Newton method comprises two regularization parameters that are based on the misfit term.

8. The method of claim 1, wherein generating the resistivity of the geological formation based on the output of the inversion of induction measurements comprises filtering a conductivity associated with each of the plurality of geological layers.

9. An article of manufacture comprising tangible, non-transitory, machine-readable media comprising instructions that, when executed by a processor, cause the processor to:
receive induction measurements associated with wellbore through a geological formation obtained by one or more downhole induction well-logging tools;
invert the induction measurements based on minimizing a cost function, wherein the cost function comprises a misfit term, an entropy term, and a smoothing term, wherein inverting the induction measurements is based on a one-dimensional model comprising a plurality of geological layers wherein the plurality of geological layers comprises a respective constant conductivity and a respective constant dielectric constant, and wherein the cost function is discretized based on a conductivity of each geological layer of the plurality of layers; and
generate resistivity and dielectric constant values associated with the geological formation based on the output of the inversion of induction measurements.

10. The article of manufacture of claim 9, wherein inverting the induction measurements is based on a partial derivative of a simulated real apparent conductivity and a simulated imaginary apparent conductivity associated with a respective conductivity value and a respective dielectric constant value of the plurality of geological layers.

11. The method of claim 10, wherein the partial derivative of the simulated real apparent conductivity and the simulated imaginary apparent conductivity with respect to dielectric constant are obtained with partial derivatives of the real and imaginary apparent conductivities with respect to conductivity.

12. The article of manufacture of claim 9, wherein the cost function is minimized based on a Gauss-Newton method.

13. The article of manufacture of claim 12, wherein the cost function is minimized iteratively until a threshold is reached, wherein the threshold is based on the misfit term.

14. A system comprising:
a downhole well-logging tool configured to obtain one or more induction measurements from a geological formation;
a processor; and
a memory storing instructions configured to be executed by the processor, the instructions comprising instructions to:
receive the induction measurements obtained by the downhole well-logging tool;
invert the induction measurements based on a one-dimensional model comprising a plurality of geological layers and a cost function, and wherein each geological layer of the one-dimensional model comprises a constant conductivity and a constant dielectric constant, and wherein inverting the induction measurements is based on a partial derivative of a simulated real apparent conductivity and a simulated imaginary apparent conductivity associated with a respective conductivity value and a respective dielectric constant values of the plurality of geological layers; and
generate resistivity and dielectric constant values associated with the geological formation based on the output of the inversion of induction measurements.

15. The system of claim 14, wherein the induction measurements are inverted based on a cost function comprising a misfit term, an entropy term, and a smoothing term.

* * * * *